US005510192A

United States Patent [19]

Utsumi et al.

[11] Patent Number: 5,510,192

[45] Date of Patent: Apr. 23, 1996

[54] POLYETHYLENE NAPHTHALATE MULTILAYERED FILM FOR HIGH DENSITY MAGNETIC RECORDING MEDIUM

[75] Inventors: Shigeo Utsumi, Yamato; Masashi Inagaki, Tsukui; Yuko Watanuki, Tokyo, all of Japan

[73] Assignee: Diafoil Hoechst Company, Limited, Tokyo, Japan

[21] Appl. No.: 906,943

[22] Filed: Jul. 1, 1992

[30] Foreign Application Priority Data

Jul. 12, 1991 [JP] Japan .................................... 3-172793

[51] Int. Cl.[6] ............................... G11B 5/66; B32B 27/06

[52] U.S. Cl. .......................... 428/480; 428/212; 428/323; 428/402; 428/447; 428/694 TP; 428/694 T; 428/694 ST; 428/694 SL; 428/694 SG

[58] Field of Search .................................... 428/212, 323, 428/402, 447, 480, 694, 900, 694 T, 694 TG, 694 ST, 694 SL, 694 SG, 695

[56] References Cited

U.S. PATENT DOCUMENTS

| | | | |
|---|---|---|---|
| 4,710,421 | 12/1987 | Ono et al. | 428/213 |
| 4,720,412 | 1/1988 | Katoh et al. | 428/141 |
| 4,780,353 | 10/1988 | Takahashi et al. | 428/141 |
| 4,798,759 | 1/1989 | Dallman et al. | 428/220 |
| 4,804,736 | 2/1989 | Utsumi | 528/176 |
| 5,045,379 | 9/1991 | Kotoini et al. | 428/156 |
| 5,051,292 | 9/1991 | Kotoh et al. | 428/141 |
| 5,069,962 | 12/1991 | Okazaki et al. | 428/323 |
| 5,106,681 | 4/1992 | Endo et al. | 428/323 |

FOREIGN PATENT DOCUMENTS

| | | |
|---|---|---|
| 0229346A1 | 12/1986 | European Pat. Off. . |
| 0522412A1 | 6/1992 | European Pat. Off. . |

*Primary Examiner*—Leszek Kiliman
*Attorney, Agent, or Firm*—Foley & Lardner

[57] ABSTRACT

Disclosed herein is a polyethylene naphthalate multilayered film for a high density magnetic recording medium comprising:

a polyethylene naphthalate layer (A), and a polyethylene naphthalate layer (B) laminated on at least one surface of said polyethylene naphthalate layer (A) and having a thickness of not more than 2 μm and specific surface characteristics, the multilayered film having Young's modulus of not less than 700 kg/mm2 in machine and transverse directions.

10 Claims, No Drawings

POLYETHYLENE NAPHTHALATE MULTILAYERED FILM FOR HIGH DENSITY MAGNETIC RECORDING MEDIUM

BACKGROUND

The present invention relates to a polyethylene naphthalate multilayered film for a high density magnetic recording medium. More specifically, the present invention relates to a polyethylene naphthalate multilayered film as a base film for a high density magnetic recording medium, having a high strength both in machine and transverse directions, being excellent in abrasion resistance and having preferred surface properties.

In recent years, a polyethylene naphthalate film having a high strength both in machine and transverse directions of the film has been considered to be promising as a base film for high density magnetic recording media, in particular, for future HDTV digital video equipments and the development thereof has now been conducted.

However, the polyethylene naphthalate film having a high strength has a drawback that particles contained in the film tend to drop out readily. In order to overcome this problem, although particles having a hard dropping-out property has been developed positively, such particles having a hard dropping-out property tend to coagulate and as a result, a defect of worsening the surface properties of the film takes place.

The high density magnetic recording medium described herein means video tapes for 8 mm track video or C-cassette, and also video tapes for HDTV such as a high vision TV, which are expected as new media in the next generation. This is particularly used suitably to the application use of vapor deposition-type video tapes including vertical magnetization-type.

For overcoming the foregoing drawbacks, as a result of the present inventor's earnest study, it has been found that by laminating a polyethylene naphthalate layer (B) having the specific surface characteristics and a thickness of not more than 2 μm on at least one surface of a polyethylene naphthalate layer (A) by coextrusion method, the obtained polyethylene naphthalate multilayered film has the Young's modulus of not less than 700 $Kg/mm^2$ in both of the longitudinal and transverse directions of the film, can prevent dropping-out of particles without worsening the surface properties of the film and is extremely useful as a film for high density magnetic recording medium. The present invention has been attained based on the finding.

SUMMARY OF THE INVENTION

In an aspect of the present invention, there is provided a polyethylene naphthalate multilayered film for a high density magnetic recording medium comprising:

a polyethylene naphthalate layer (A), and a polyethylene naphthalate layer (B) laminated on at least one surface of the polyethylene naphthalate layer (A), and having a thickness of not more than 2 μm and characteristics represented by the following formulae (1)–(3), said multilayered film having a characteristic represented by the following formula (4).

$$0.002 \leqq Ra \leqq 0.010 \quad (1)$$

$$H_2 \leqq 0.1 \quad (2)$$

$$50 \leqq Pc \quad (3)$$

$$Y \leqq 700 \quad (4)$$

[wherein Ra represents a center line average roughness (μm) at the surface of polyethylene naphthalate layer (B), $H_2$ represents the number of second or more order of protuberances by a multiple interference method in the surface of the polyethylene naphthalate layer (B) (number/25 $cm^2$), Pc represents the number of peak counts in the surface of the polyethylene naphthalate layer (B) (number/0.8 mm) and Y represents Young's modulus in the longitudinal and transverse directions of the film ($kg/mm^2$)].

DETAILED DESCRIPTION OF THE INVENTION

The polyethylene naphthalate used in the present invention means a polymer substantially composed of ethylene-2,6-naphthalate units as a constituent unit and it also includes ethylene-2,6-naphthalate polymer modified by a small amount, for example, not more than 10 mol %, preferably, not more than 5 mol % of a third component.

Polyethylene-2,6-naphthalate is produced generally by condensating naphthalene-2,6-dicarboxylic acid or a derivative thereof, for example, methyl naphthalene-2,6-dicarboxylate and ethylene glycol in the presence of a catalyst under appropriate reaction conditions. As the third component, dicarboxylic acids such as adipic acid, oxalic acid, isophthalic acid, terephthalic acid, naphthalene-2,7-dicarboxylic acid and diphenylether carboxylic acid, or lower ($C_1$–$C_4$) alkyl esters thereof; oxycarboxylic acids such as p-oxybenzoic acid and p-oxyethoxybenzoic acid, or lower ($C_1$–$C_4$) alkyl esters thereof; dihydric alcohols such as propylene glycol, trimethylene glycol, tetramethylene glycol, pentamethylene glycol, hexamethylene glycol and diethylene glycol; and polyalkylene glycols such as polyethylene glycol and polytetramethylene glycol may be exemplified. Upon polymerization, additives, for example, a flatting agent such as titanium dioxide, stabilizer such as phosphoric acid, phosphorus acid and ester thereof, antioxidant such as hindered phenol, polymerization modifier, crystallization modifier such as a higher aliphatic carboxylic acid, and plasticizer may be added.

The mechanical property of the polyethylene naphthalate used in the present invention is deteriorated, if the polymerization degree is too low. The intrinsic viscosity thereof is not less than 0.40, preferably from 0.5 to 0.7.

The polyethylene naphthalate layer (A) in the present invention may contain particles within such a range as not giving undesired effects on the exposed surface of the polyethylene naphthalate layer (B). Further, the polyethylene naphthalate layer (A) may contain additives such as organic lubricant, stabilizer, colorant, antioxidant, defoamer and antistatic agent, if necessary.

As the method of incorporating particles into polyethylene naphthalate, a particle addition method and a precipitated particle method can be exemplified. In the precipitated particle method, fine particles are precipitated by reacting a phosphorus compound with a metal compound dissolved in a reaction system upon production of polyethylene naphthalate, for example, a metal compound dissolved in the reaction system after the ester-exchange reaction. Such method is preferred particularly in that coarse particles are less formed.

In the particle addition method, fine inactive particles are blended in one of the steps from the polyethylene naphthalate production to the film-formation. As the inactive particles, alumina, kaolinite, talc, magnesium carbonate, calcium carbonate, barium carbonate, calcium sulfate, barium sulfate, lithium phosphate, calcium phosphate, magnesium phosphate, magnesium oxide, silicon oxide, titanium oxide, lithium fluoride, and one or more of metal compounds selected from the group consisting of terephthalates of Ca, Ba, Zn and Mn, or carbon black and organic polymers may be exemplified. But the inactive particles are not limited thereto.

The shape of the inactive particles may be in any of spherical, lump or flatty and there are no particular restrictions also on the hardness, specific gravity and color. The average particle diameter of the inactive particles is usually from 0.001 to 10 μm, preferably from 0.1 to 3 μm in equivalent diameter of equal volume sphere. The blending amount of the inactive particles is usually not more than 1% by weight, preferably from 0.01 to 0.5% by weight, more preferably from 0.02 to 0.3% by weight based on the film. However, in a case where the polyethylene naphthalate layer (A) is disposed between the polyethylene naphthalate layers (B), the polyethylene naphthalate layer (A) substantially free of particles is preferred in view of the cost and the effect on the exposed surface of the polyethylene naphthalate layer (B). The definition of "substantially free of particles" means that the content of the particles is not more than 0.05% by weight.

A recycled resin, particularly, a recycled resin containing ILC (In-Line Coat) coating agent may be incorporated into the polyethylene naphthalate layer (A) in such a range as not giving undesired effects on the polyethylene naphthalate layer (B).

The thickness of the polyethylene naphthalate layer (B) of the film in the present invention is not more than 2 μm, preferably from 0.1 to 1.0 μm, more preferably from 0.1 to 0.5 μm. If the thickness of the polyethylene naphthalate layer (B) exceeds 2 μm, the dispersibility and the homogenity of the particles at the surface of the layer (B) are worsened under the effect of the particles contained in the polyethylene naphthalate layer (B).

The Ra of the surface of the polyethylene naphthalate layer (B) is within a range from 0.002 to 0.010 μm, preferably from 0.002 to 0.008 μm and, more preferably from 0.003 to 0.008 μm.

If the Ra is less than 0.002 μm, the handleability is worsened and, if Ra exceeds 0.010 μm, it is difficult to increase density.

Even when the Ra is not more than 0.010 μm, the existence of coarse protuberances may cause drop-out or the like and, accordingly, the number of second or more order of protuberances by multiple interference method has to be not more than 0.1 protuberance/25 $cm^2$, preferably not more than 0.01 protuberance/25 $cm^2$. As the method of reducing coarse protuberances, a method of removing the coarse protuberances by passing the material through a filter upon extrusion has been adopted in the polyethylene terephthalate film. However, since the melt viscosity is high in the case of a polyethylene naphthalate film, a pressure difference before and after the filter can not be set so high as in the case of polyethylene terephthalate, it is preferred that protuberances are removed upon polymerization and that the polymer is directly introduced in a molten state after polymerization to an extruder and then filtrated through a filter. A filter having a large filtration area is preferably used. If the filtration area of the filter upon forming the film is increased, it is not desirable since occurrence of obstacles such as non-nucleus grains is promoted in the film. As the filter, leaf-type filter is preferred and as the material, metal gage, sintered metal gage, sintered metal or the like may be usually used. The mesh of the filter is preferably from 1,000 to 10,000 mesh.

In the present invention, the peak count number Pc of the surface of the polyethylene naphthalate layer (B) is not less than 50 parts/0.8 mm, preferably not less than 75 parts/0.8 mm, more preferably not less than 100 peaks/0.8 mm. If the Pc is less than 50 peaks/0.8 mm, the slipperiness of the film is deteriorated.

For obtaining the film having each of the properties as described above, the content of particles in the polyethylene naphthalate layer (B) is usually not less than 0.3% by weight, preferably from 0.5 to 10% by weight, more preferably from 1.0 to 5% by weight to the polyethylene naphthalate layer (B).

There is no particular restrictions on the particle diameter, the amount and the kind of particles contained in the polyethylene naphthalate layer (B) so long as the physical properties described above are not impaired. The particles to be incorporated in the polyethylene naphthalate layer (B) are preferably fine particles having the primary particle diameter of 1 to 300 nm, preferably 1 to 100 nm, and the amount thereof to be added is preferably not less than 0.3% by weight. If the primary particle diameter is less than 1 nm, the number of particles becomes excessive for providing a predetermined surface roughness and as a result a tendency of coagulation is shown and the coarse protuberances increase. On the other hand, if it exceeds 300 nm, particles become individual particles and tend to drop out readily from the film surface. Since particles having the primary particle diameter of 1 to 100 nm are linked up and second particles are formed, they less drop out from the surface of the film and satisfactory properties thereof are imparted. As typical examples of such particles, fine silica synthesized by a gas phase method or carbon black may be exemplified. The particles described above may of course be used together in order to obtain satisfactory properties, if necessary.

The total thickness of the multilayered film of the present invention composed of the polyethylene naphthalate layer (A) and the polyethylene naphthalate layer (B) are 1 to 15 μm, preferably 3 to 10 μm.

The polyethylene naphthalate film according to the present invention has Young's modulus in machine and transversal directions, of not less than 700 $kg/mm^2$, preferably not less than 800 $kg/mm^2$, more preferably not less than 1,000 $kg/mm^2$ in the machine direction and not less than 800 $kg/mm^2$ in the transversal direction. It is difficult to form a thin film (for example, the thickness thereof is not more than 5 μm), if the Young's modulus thereof is not more than 700 $kg/mm^2$.

The multilayered film according to the present invention basically comprises a two-layered film composed of a polyethylene naphthalate layer (B)/a polyethylene naphthalate layer (A). It is preferred that the multilayered layer of the present invention is composed of a 1st polyethylene naphthalate layer (B)/a polyethylene snaphthalate layer (A) / a 2nd polyethylene naphthalate (B), in which surface roughnesses of 1st and 2nd polyethylene naphthalate layers (B) are identical or different each other. In addition to the two-layered or three-layered film, a multiple-layered film may be used.

The thus obtained film according to the present invention is used as a metal coating-type base film for long-time C-cassette and, particularly, it is used as the base film of a ferromagnetic thin metal film type. As the ferromagnetic metal, cobalt, iron, nickel or an alloy thereof, or an alloy of the above-mentioned metal with chromium or tungsten may be used.

As the method of forming the metal thin film, a wet vacuum-vapor deposition method by electroless plating or electrolytic plating and a dry method by sputtering or ion plating is used. In particular, the wet vacuum-vapor deposition method is preferred for forming the metal thin film since the deposition rate is extremely great and a high coercive force can be obtained. When the multilayered film is applied as the metal thin film-type base film, it is preferred that number of first or more order of protuberances per 100 $cm^2$ is less than 10 on the surface of the polyethylene naphthalate layer (B) on which the thin metal film is formed.

For imparting the tape running property, a coating film of an organic polymer containing a lubricant can be formed on the surface opposite of the base film to the magnetic thin film. As examples of the lubricant, there can be exemplified aluminum acrylate, molybdenum, fine silica and fluoro resin. It is preferred that the above-mentioned lubricant is dispersed in a solution or an emulsion of an organic polymer having adhesiveness with the base film (for example, a polyether containing a glycidyl ether of polyoxyalkylene glycol or a copolyester having an acid ingredient in which naphthalene-2,6-dicarboxylic acid is modified with an aliphatic dicarboxylic acid) and after machine stretching and before transverse stretching of the multilayered film, the resultant solution or dispersion is applied by in-line coating on the surface of the multilayered film to form a lubricant layer.

In addition to the uniformly entire coating such as the lubricant layer described above, a so-called ridged discontinuous coating layer may also be formed. In this case, as the coating agent, a mixture of a linear silicone compound (a) having a molecular weight of 30,000 to 300,000, a silane coupling agent (b), a water soluble polymer (c) and a wax (d) at the mixing ratio of (a):(b):(c):(d)=10-100:5-100:10-200:0-200 (by weight) may be used.

On the other hand, it is not always necessary to form a coating layer on the surface of the polyethylene naphthalate layer (B) on which the magnetic layer is formed, but any of the uniformly coating film or partial coating film described above may be formed within such a range as not deteriorating the film-forming property. In particular, a coating film containing, as the solid content, 0.5 to 150 parts by weight of colloidal particles based on the 100 parts by weight of a water soluble resin component can be exemplified.

A back coating layer may be disposed by a known means on the side opposite to the magnetic surface of the thus obtained magnetic tape. The back coating layer may be formed before forming the magnetic layer, but it is preferably formed after the formation of the magnetic layer.

The multilayered film according to the present invention has a high strength, and is excellent in the surface property and abrasion resistance with no dropping out of particles, which is extremely useful as a base film for a high density magnetic recording medium and of a highly industrial value.

EXAMPLE

The present invention will now be described more concretely referring to drawings but the invention is not restricted to such examples unless it does not go beyond the scope of the invention. Methods of measuring physical property values for the film are shown below.

(1) Young's Modulus

Young's modulus was measured under the following conditions using a tension UTM-II model (manufactured by Toyo Baldwin Co.) under 25° C. & 50% RH: Shape of specimen:

| | |
|---|---|
| Long strip type | (15 cm in length × 1 cm in width) |
| Chuck distance | 10 cm |
| Tensile speed | 100%/mm |

(2) Center Line Average Surface Roughness (Ra: μm)

Average surface roughness (Ra) was determined in the following way by using a surface roughness tester (SE-3PZ mfd. by Kosaka Kenkyusho Inc.). The radius at the tip of the stylus was 2 μm and the load applied thereto was 30 mg. A portion of the reference strength L (2.5 μm) was cut out in the direction of the center line from the sectional curve of the film. In the coordinates with the center line of the cut-out portion on the X-axis and the direction of longitudinal magnification on the Y-axis, and with the roughness curve expressed by y=f(x), the value given from the following formula was represented as surface roughness Ra (μm). The cutoff value was 80 μm, and the Ra was measured at 5 points in both longitudinal and transverse directions, and the average of the measurements at the total 10 points was calculated.

$$Ra = \frac{1}{L} \int_0^{l} |f(x)|\, dx$$

(3) Number of Coarse Protuberances ($H_1$, $H_2$)

After depositing aluminum on the surface of a film, interference fringes were observed at a measuring wavelength of 0.54 μm by a multiple interference method using a surface finish microscope (manufactured by Nippon Kogaku Co., Ltd. ). The number of first or more order of interference fringes was counted by an area of 10 $cm^2$, and was calculated as the number of coarse protuberances in 100 $cm^2$ ($H_1$). For $H_2$, number second or more order of protuberances per 25 $cm^2$ was counted. In the measurement, mirror reflectance was 65%.

(4) Thickness Ratio

For the thickness of not more than about 0.5 μm, after slicing the film by a microtome it was photographed at a rate of 20,000×by TEM (Transmission Electron Microscope) and the thickness ratio was measured. For the thickness of not more than 0.5 μm, since the thickness could not be measured by the method described above, the concentration of inorganic particles was measured by using a secondary ion mass spectroanalyzer (SIMS) and the thickness ratio was calculated.

EXAMPLE 1

(Preparation of polyethylene naphthalate)

100 parts by weight of dimethyl naphthalene-2,6-dicarboxylate, 60 parts by weight of ethylene glycol and 0.1 parts by weight of calcium acetate monohydrate were charged in a reactor and an ester exchanging reaction was conducted. The reaction starting temperature was 180° C. and the reaction temperature was gradually elevated, along with distillation of methanol, to 230° C. after 4 hours, at which the ester exchanging reaction was completed substantially.

Then, after adding 0.04 parts by weight of phosphoric acid, 0.04 parts by weight of antimony trioxide were added and the polycondensating reaction was conducted by a usual method. The reaction temperature was gradually elevated, while the pressure was gradually reduced from a normal pressure, and after 2 hours, the reaction temperature was 250° C. and the pressure was 0.3 mmHg.

The reaction was terminated 4 hours after starting the reaction, to discharge polyethylene naphthalate under a pressurized nitrogen. The molten polymer was immediately filtered a filter corresponding to 2500 mesh which was directly coupled to an extruder, and it was drawn into a strand shape and cut into a chip, thereby obtaining a raw material for the polymer. The resultant raw material for the polyethylene naphthalate polymer ($A_1$) has an intrinsic viscosity(η) of 0.68.

The polyester ($A_1$) and carbon black particles having an average particle diameter of 15 nm were kneaded by using a twin screw breeder, and passed through a 1000-mesh filter to form chips, thereby obtaining a master batch at a carbon black concentration of 10 wt % and an intrinsic viscosity(η) was 0.60. It was referred to as a polyester ($B_1$).

(Preparation of polyethylene naphthalate film)

The raw material for the polyester polymer ($A_1$) was used as the polyester layer (A), while a blend of the raw material for the polyester polymer ($A_1$) and the raw material for the polyester polymer ($B_1$) at a weight ratio of 8.1:1.9 was used as the polyester layer (B). After drying both of the polyester forming the polyester layer (A) and the polyester forming the polyester layer (B) containing carbon black of 1.9% by weight based on the polyester layer (B), separately, and they were melted in separate extruders at a temperature of 295° C., laminated in a passageway and subsequently, extruded by a coextrusion method so as to form a multilayered film composed of polyester layer (B)/polyester layer (A)/polyester layer (B) and then quenched, thereby obtaining an unstretched film.

The thus-obtained amorphous film was stretched, at first, 30 times in the machine direction at a temperature of 135° C. to obtain a biaxially stretched film. The resultant biaxially stretched film was further stretched 1.40 times in the machine direction at a temperature of 138° C. and then stretched again 1.22 times in the transverse direction at a temperature of 209° C., and then heat-set at a temperature of 230° C. to obtain a film of 9 μm in thickness. The thickness for each of the layer (A) and the layer (B) in the resultant multilayered film was 0.3 μm/8.4 μm/0.3 μm.

COMPARATIVE EXAMPLE 1

A film was formed in the same procedures as those in Example 1 except for changing the thickness of polyester layer (B) in Example 1 to 4 μm and polyester layer (A) in Example 1 to 1.0 μm, to obtain a film of 9 μm in thickness.

COMPARATIVE EXAMPLE 2

A film was formed in the same procedures as those in Example 1 except for changing the carbon black content in the polyester layer (B) to 0.2% by weight in Example 1, to obtain a film of 9 μm in thickness.

For the samples, metal magnetic material was coated in accordance with a usual method and a back coating was applied on the side opposite of the film to the magnetic film, thereby obtaining a 30 min-tape for C-cassette. The tape obtained with the film of Example 1 was a magnetic tape both excellent in the electric property and the drop-out property. On the contrary, both of the films in Comparative Example 1 and Comparative Example 2 showed remarkable increase of drop-out and could not be put to practical use as the magnetic tape, because of course protuberances in Comparative Example 1 and injuries produced to the film upon the film production in Comparative Example 2.

EXAMPLE 2

A three-layered film in which a smooth layer was laminated on one side and a slippery layer was laminated on the other side of the polyester layer (A) was prepared. Namely, a film of 6.0 μm in thickness was obtained in the same procedures as those in Example 1 except for using the smooth layer having a thickness of 0.2 μm by incorporating 0.5% by weight of the carbon black used in Example 1 and the slippery layer having a thickness of 0.2 μm by incorporating 1.2% by weight of the same carbon black and changing the second stretching ratio in the machine direction to 1.45 times.

When an ME tape for 8 m/m video was manufactured by disposing a thin metal magnetic film on the smooth surface and a back coating layer on the slippery surface of the resultant film by a usual method, the obtained ME tape showed excellent properties.

The results obtained as described above are shown in the following Table 1.

TABLE 1

| | Ra | $H_2$ (number/25 cm$^2$) | $H_1$ (number/100 cm$^2$) | Pc (number/0.8 mm) | Young's modulus (kg/mm$^2$) Machine direction | Young's modulus (kg/mm$^2$) Transverse direction |
|---|---|---|---|---|---|---|
| Example 1 | 0.008 | 0 | — | 130 | 750 | 820 |
| Comp. Example 1 | 0.015 | 15 | — | 45 | 750 | 820 |
| Comp. Example 2 | 0.001 | 0 | — | 120 | 750 | 820 |
| Example 2 | 0.003 (0.006)*1 | 0 | 5 | 110 | 810 | 800 |

(Note)
*1Ra on the opposite surface

What is claimed is:

1. A polyethylene naphthalate multilayered film for a high density magnetic recording medium comprising:

a polyethylene naphthalate layer (A) having a first surface and a second surface, and a polyethylene naphthalate layer (B) having a laminating surface and a protrusion surface, said layer (B) being laminated on at least one surface of said polyethylene naphthalate layer (A), and having a thickness of not more than 2 μm and characteristics represented by the following formulae (1)–(3), and the multilayered film having characteristics represented by the following formula:

$$0.002 \leqq Ra \leqq 0.010 \quad (1)$$

$$H_2 \leqq 0.1 \quad (2)$$

$$50 \leqq Pc \quad (3)$$

$$Y \geqq 700 \quad (4)$$

wherein

Ra represents a center line average roughness, measured in micrometers, at the surface of the polyethylene naphthalate layer (B), $H_2$ represents the number of second or higher order protuberances in the surface of the polyethylene naphthalate layer (B), measured in units of number/25 $cm^2$, determined by the multiple interference method, Pc represents the number of peak counts at the surface of the polyethylene naphthalate layer (B), measured in units of number/0.8 mm, and Y represents Young's modulus in the machine direction and transverse direction of the film, measured in units of kg/$mm^2$.

2. A film according to claim 1, wherein the polyethylene naphthalate has an intrinsic viscosity of not less than 0.4.

3. A film according to claim 1, wherein the polyethylene naphthalate (A) contains not more than 1% by weight of inert compound particles having an average particle diameter, as measured by means of the equivalent diameter, of from 0,001 to 10 μm.

4. A film according to claim 1, wherein the polyethylene naphthalate (B) contains not less than 0.5% by weight of fine particles having the primary particle diameter of from 1 nm to 300 nm.

5. A film according to claim 1, wherein the Young's modulus of the polyethylene naphthalate, both in the machine direction, and the transverse direction is not less than 800 kg/$mm^2$.

6. A film according to claim 1, whereon the number of second or more order of protuberances in the polyethylene naphthalate layer (B) is not more than 0.01/25 $cm^2$, as measured by the multiple interference method.

7. A film according to claim 1, wherein a ridged discontinuous coating layer is formed on the surface of the multilayered film opposite to that formed with a thin magnetic film wherever said layer comprises a silicone compound (a), a silane coupling agent (b), a water soluble polymer (c) and a wax (d) at a mixing ratio measured by weight of (a):(b):(c):(d)=10-100:5-100:10-200:0-200 (by weight).

8. A multilayered film according to claim 1, further comprising a lubricant layer on a first surface of said film and a thin magnetic film layer on a second surface of said film wherein said first and second surfaces are opposite to one another.

9. A film according to claim 1, comprising a thin film magnetic layer on a surface of said multilayered film.

10. A film according to claim 8, wherein a coating of a water soluble resin is formed on said magnetic film layer, said resin containing as the solid content 0.5 to 150 parts by weight of colloid particles of said resin based on 100 parts by weight of the water soluble resin.

* * * * *